United States Patent [19]

Krumwiede et al.

[11] Patent Number: 4,600,425
[45] Date of Patent: Jul. 15, 1986

[54] BUBBLER WITH PROTECTIVE SLEEVE OR FLUID COOLANT JACKET

[75] Inventors: John F. Krumwiede, Cresaptown, Md.; William G. Hilliard; Roy M. Sims, both of Lower Burrell, Pa.

[73] Assignee: PPG Industries, Inc., Pittsburgh, Pa.

[21] Appl. No.: 717,940

[22] Filed: Mar. 29, 1985

[51] Int. Cl.⁴ ............................................. C03B 5/193
[52] U.S. Cl. ......................................... 65/178; 65/32; 65/134
[58] Field of Search ............................ 65/32, 178, 134

[56] References Cited

U.S. PATENT DOCUMENTS

| | | | |
|---|---|---|---|
| 3,066,504 | 12/1962 | Hartwig et al. | 65/32 X |
| 3,170,781 | 2/1965 | Keefer | 65/178 X |
| 3,212,871 | 10/1965 | Vatterodt | 65/32 X |
| 3,219,427 | 7/1962 | Hymowitz | 65/134 |
| 3,294,509 | 7/1962 | Soubier et al. | 65/134 |
| 3,305,340 | 3/1964 | Atkeson | 65/134 |
| 3,397,973 | 8/1968 | Rough | 65/134 |
| 3,498,778 | 3/1970 | Hynd | 65/178 |
| 3,853,524 | 12/1974 | Schwenninger | 65/178 |
| 4,433,419 | 2/1984 | Williamson | 373/37 |

FOREIGN PATENT DOCUMENTS 737364  6/1980  U.S.S.R. ................. 65/178

Primary Examiner—Robert Lindsay
Attorney, Agent, or Firm—Robert A. Westerlund, Jr.

[57] ABSTRACT

A bubbler assembly comprising a bubbler tube having a sleeve surrounding at least a portion thereof to define an annular space therebetween. A corrosion-inhibiting gas is introduced into the space to minimize oxidation and alkali-sulfate corrosion of the bubbler tube, or preferably the gas is moved through the space to purge the space of oxygen and alkali-sulfate corrosives, when the bubbler assembly is mounted within a mounting hole provided through a refractory wall, e.g. the bottom, of a glassmaking furnace.

The bubbler assembly alternatively comprises a bubbler tube, a fluid coolant jacket mounted within the refractory wall mounting hole, and facilities for facilitating movement of the bubbler tube relative to the refractory wall, independently of the fluid coolant jacket.

11 Claims, 5 Drawing Figures

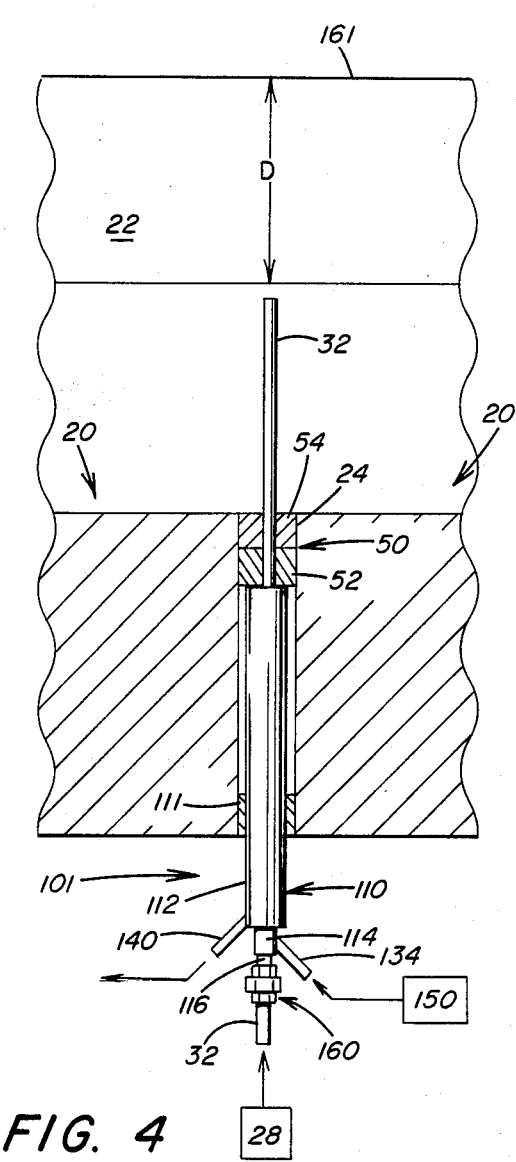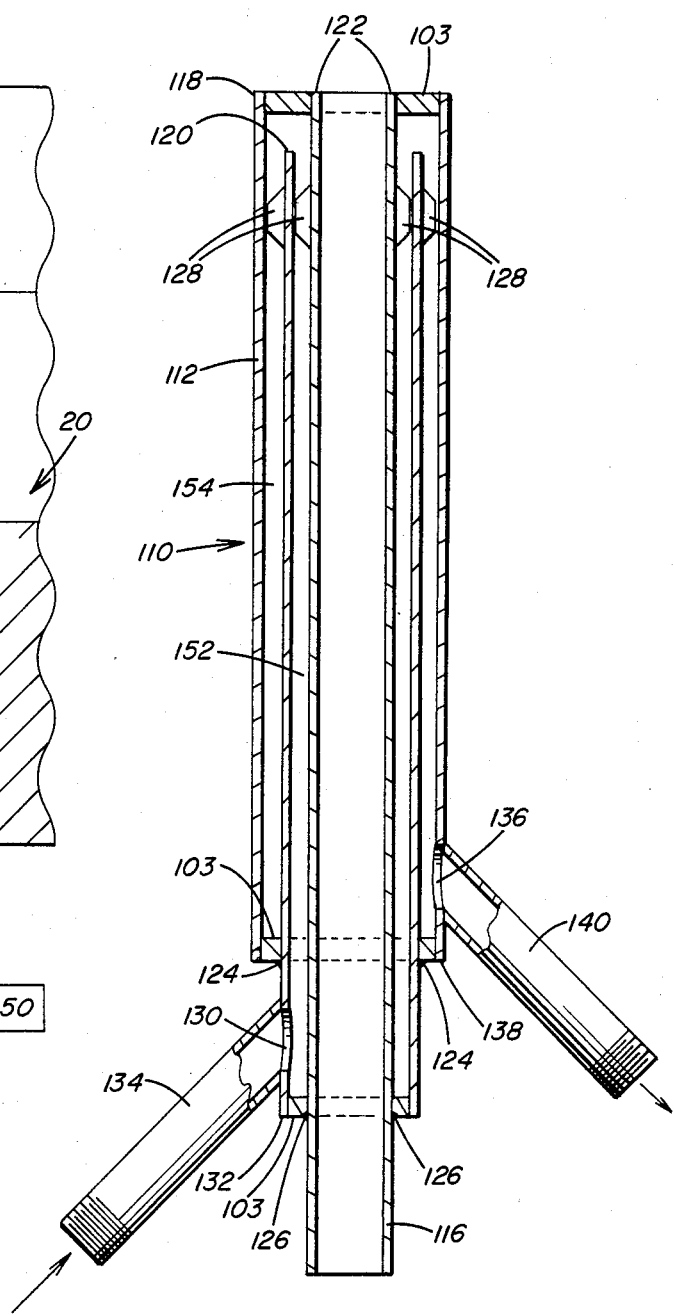
FIG. 4
FIG. 5

BUBBLER WITH PROTECTIVE SLEEVE OR FLUID COOLANT JACKET

FIELD OF THE INVENTION

The present invention relates generally to bubblers employed to thermally and chemically homogenize molten glass contained by a melter tank or the like, and more particularly, to a bubbler having a protective sleeve or fluid coolant jacket to minimize corrosion thereof.

BACKGROUND OF THE INVENTION

In a typical glass melting furnace, glass batch ingredients are fed into a melting tank. The melting tank is provided with heating ports which are supplied with a combustible air-fuel mixture to issue combustion flames over the layer of batch ingredients fed onto the surface of previously melted glass in the tank. A temperature gradient exists between the surface of the glass, which is directly exposed to the applied flame heat, and the glass layer along the bottom of the tank. In order to obtain optimum melting conditions, it is desirable to maintain the temperature between the surface of the glass and the bottom layers of the glass as nearly uniform as possible, such as by setting up and controlling convection currents in the tank to continually mix the surface and bottom layers of glass. Bubbler systems have been successfully utilized in this regard to thermally and chemically homogenize the glass. Some representative bubbler systems are taught in U.S. Pat. Nos. 3,294,509 issued to Soubier; 3,853,524 issued to Schwenninger; 3,305,340 issued to Atkeson; 3,219,427 issued to Hymowitz; and 3,397,973 issued to Rough. Briefly, these bubbler systems employ a series of bubbler tubes arranged in various patterns usually along the refractory bottom or floor of the melting furnace. The bubbler tubes emit a gas into the molten glass and glass forming batch materials. The emitted gas enters the molten glass as a series of small bubbles at the bottom of the furnace. The bubbles expand under the influence of the high furnace and glass temperatures and rise toward the surface of molten glass where they burst and ordinarily are expelled from the furnace together with the gaseous products of combustion. Incident to the rising movements of these expanding gas bubbles, there is produced an agitation and stirring of the molten glass and unmelted batch materials. This agitation raises the relatively colder glass from the bottom of the furnace to the surface of the molten glass for exposure to heat. The displacement of the colder portions of the glass body causes displacement of upper hotter portions of the glass body into those normally colder lower portions of the glass body to thereby establish strong convection currents in the glass body. The convection currents act to continually mix the surface and bottom layers to minimize the temperature gradient through the molten glass body. Further, the bubbler action (i.e. agitation and stirring of the molten glass) promotes the expulsion of small gas bubbles or "seeds" which are entrapped within the molten glass during the melting process, thereby improving the quality of the glass. Moreover, this bubbler action achieves greater chemical as well as thermal homogeneity of the glass, a more economical utilization of the heat employed for the melting and refining operations and increased furnace melting capacity.

Although the hereinabove discussed bubbler systems have gained commercial acceptance, premature failure of the bubbler tubes due to oxidation and alkali-sulfate corrosion within the refractory mounting hole has inhibited the use of bubbler systems. This is so because often times when a bubbler tube is rendered inoperative, a new hole must be drilled through the refractory bottom to receive or accept a new bubbler tube. This is a time-consuming, costly, labor-intensive process. Further, each tube replacement procedure may disrupt the operational continuity of the melting furnace bubbler system which may result in the production of defective or inferior quality glass, because the loss of operational bubblers before replacement constitutes a threat to uniform heat distribution and glass homogeneity.

The prior art teaches the use of composite bubblers constructed of a molybdenum tube advantageously joined to a stainless steel tube as by brazing with nickel palladium. An inert gas such as nitrogen is moved through the bubblers to stir, agitate, and mix the molten glass. It has been determined that the portion of the molybdenum tube disposed within the hole in the refractory bottom of the melter tank is very susceptible to oxidative deterioration and alkali-sulfate corrosion. The molybdenum tube portion which extends into the molten glass is protected from oxidation and most alkali-sulfate corrosion because it is not exposed to oxygen as is the molybdenum tube portion which is disposed in the refractory bottom hole. High-grade, corrosion-resistant refractory metals such as inconel or other nickel alloy steel materials have also been unsuccessfully employed, due to relatively rapid deterioration in the hostile atmosphere of the refractory mounting hole. The temperature in the refractory mounting hole upper portion often exceeds 2,000° F. (1,110° C.). This high temperature condition, in combination with the highly oxidizing, alkali-sulfate atmosphere of the refractory bottom hole through which the composite bubbler is inserted, rapidly corrodes and deteriorates known materials. For example, stainless steel oxidizes at temperatures greater than about 1,700° F. (950° C.) and is also vulnerable to high temperature alkali-sulfate corrosion. U.S. Pat. No. 3,853,524 issued to Schwenninger teaches a monolithic molybdenum bubbler tube having a protective disilicide outer surface coating to protect the molybdenum tube from oxidizing in air. However, bull's-eye defects, stress cracks, handling damage, coating thickness variations, and bending stresses from improper installation have caused premature failure of the tubes within the refractory bottom, due to breakdown of the oxidation resistance of the disilicide coating.

Therefore, there presently exists a need for a bubbler capable of withstanding the hostile refractory mounting hole environment and which is more durable and longer lasting than presently available bubbler tubes.

BRIEF DESCRIPTION OF THE DRAWINGS

FIG. 4 is a fragmentary, elevational view showing a bubbler assembly embodying teachings of an alternative embodiment of the present invention.

FIG. 5 is an elevational, cross-sectional view of a fluid coolant jacket suitable for use in the bubbler assembly of the alternative embodiment of this invention.

SUMMARY OF THE INVENTION

This invention encompasses a bubbler assembly including a molybdenum or composite molybdenum and stainless steel or other refractory material bubbler tube having a protective sleeve mounted in surrounding relationship to a portion of the bubbler tube which is mountable within a mounting hole provided in a refractory wall, e.g. the bottom or side walls of a furnace. The protective sleeve is connected in supporting relationship to the bubbler tube to structurally reinforce the overall bubbler assembly. This feature reduces mechanical and thermal bending stresses acting upon the bubbler tube, thereby reducing the rate of failure of the tube due to stress conditions. The present invention further encompasses facilities for filling or purging the annular space between the tube and sleeve with a reducing gas, e.g. forming gas, or an inert gas, to eliminate or minimize the hostile, severely corrosive, oxidizing, alkali-sulfate refractory bottom mounting hole atmosphere which would otherwise form in the annular space between the tube and the sleeve. The purge gas can suitably be the same as the bubbling gas, e.g., nitrogen, or a forming gas, i.e., a hydrogen-nitrogen mixture which is especially suitable since hydrogen is an effective scavenger of oxygen.

The present invention alternatively encompasses a bubbler assembly including a water, air, or other fluid coolant jacket mounted within a mounting hole drilled through a refractory wall, e.g. the bottom or side walls of a melter or refiner of a glassmaking tank or furnace, and a monolithic or composite bubbler tube inserted through the fluid coolant jacket in such a manner as to extend through the entire length of the fluid coolant jacket and into molten glass held by the melter or refiner. The bubbler tube is preferably vertically adjustably supported for independent movement relative to the fluid coolant jacket for thereby facilitating varying the location of the bubbler tube in the molten glass or complete removal of the tube from the jacket for repair or replacement. The fluid coolant jacket serves to lower the temperature within the refractory wall mounting hole to minimize corrosive reactions between the oxidizing, alkali-sulfate mounting hole atmosphere and the bubbler tube outer surface.

DESCRIPTION OF THE PREFERRED EMBODIMENT OF THE INVENTION

Figure 1:
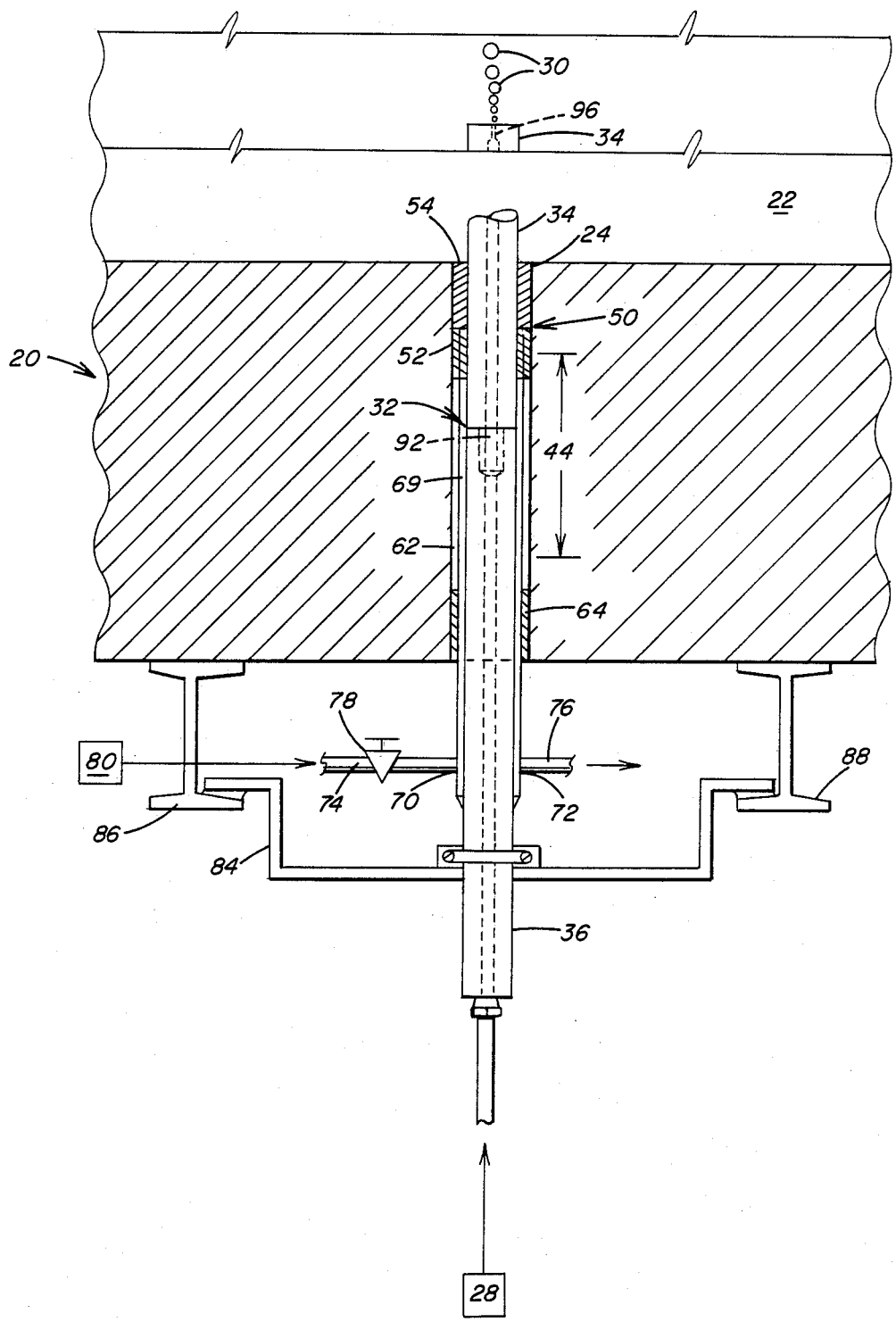
FIG. 1 is a fragmentary, elevational view showing a bubbler assembly constructed in accordance to the teachings of this invention mounted through the refractory bottom of a glassmaking furnace.

Referring now to FIG. 1, there can be seen a longitudinally oriented mounting hole 24 suitably drilled or otherwise provided through a refractory wall, e.g. a side wall, or preferably through the refractory bottom 20 of a typical glassmaking furnace which contains a body of molten glass 22. A bubbler assembly 26 constructed in accordance with this invention is installed in a manner hereinafter described within the mounting hole 24. The bubbler assembly 26 is operative to inject a gaseous or gas forming bubbling medium from a suitable bubbler gas supply source 28, via feeder pipe 29, into the body of molten glass 22. In this respect, the operation of the bubbler assembly 26 is suitably standard, e.g., such as is taught in U.S. Pat. No. 3,853,524 issued to Schwenninger and assigned to the assignee of the present invention, which teachings are herein incorporated by reference. More particularly, the gaseous bubbling medium is emitted into the stream of molten glass 22 in the form of gaseous bubbles 30 which gradually expand in size, as illustrated, due to decreasing pressure as they rise and due to the influence of the elevated temperatures of the furnace and molten glass 22. As the progressively expanding bubbles 30 rise toward the surface of the molten glass 22, they stir and agitate the molten glass 22 to thereby produce convective currents in the molten glass 22. Upon reaching the surface of the molten glass 22, the expanded gas bubbles 30 burst and are discharged from the furnace together with the furnace stack or exhaust gases. The stirring or agitation of the molten glass 22 and convection currents engendered by the gas bubbles 30 minimizes the temperature/thermal gradient throughout the depth of the molten glass 22 and greatly enhances the chemical and thermal homogeneity of the entire body of molten glass 22 held by the furnace.

Figures 2, 3:
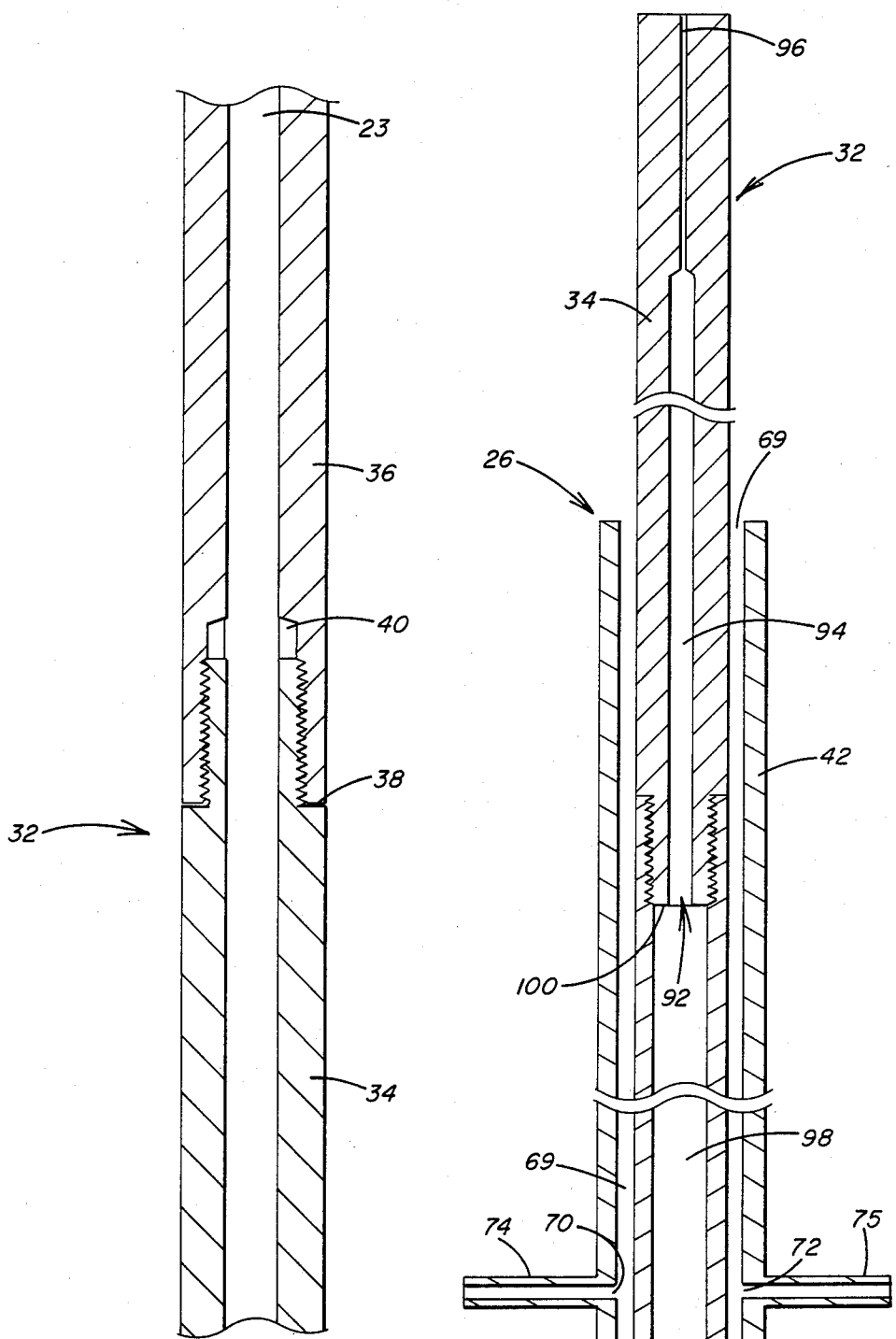
FIG. 2 is a sectional, elevational view of a bubbler tube suitable for use in the bubbler assembly of this invention.
FIG. 3 is an elevational, cross-sectional view of a bubbler assembly embodying teachings of this invention.

In accordance with the present invention, the bubbler assembly 26 preferably includes a bubbler tube 32 fabricated from a high temperature, corrosion resistant refractory material such as stainless steel, high nickel content stainless steel alloys (such as inconel), molybdenum, or the like. Referring also to FIG. 2, bubbler tube 32 most preferably comprises a composite molybdenum and inconel bubbler tube having an upper tube portion 34 constructed from molybdenum and a lower tube portion 36 constructed from inconel. The upper tube portion 34 and the lower tube portion 36 are sealingly joined in any convenient fashion such as by threading and/or brazing the joint 38 with nickel-palladium or the like. A bronze (e.g. naval bronze) insert 40, or the like, can also be employed to enhance the joint seal. However, it should be clearly understood that the specific construction of the bubbler tube 32 is not limiting to this invention, and can suitably be, for example, an all-molybdenum tube, such as one having a disilicide anti-corrosive outer surface coating, such as is taught in U.S. Pat. No. 3,853,524, issued to Schwenninger.

The bubbler assembly 26 also includes a structural reinforcement/protective sleeve 42 made of a high-temperature, corrosion resistant, refractory material such as stainless steel, preferably a high nickel content stainless steel alloy material, such as inconel. The sleeve 42 is conveniently mounted within the mounting hole 24 in surrounding relationship to at least a substantial portion of the composite bubbler tube 32, and preferably, in surrounding relationship to at least the portion of the composite bubbler tube 32 which is located within the portion 44 of the mounting hole 24 where the corrosive atmosphere is most severe and most likely to deteriorate the tube 32 and sleeve 42 and cause failure thereof. The portion 44 of the mounting hole 24 will hereinafter be referred to as the critical zone 44.

In general, stainless steel oxidizes at temperatures above about 1,700° F. (950° C.) and is rapidly corroded by exposure to molten or partially molten glass. Molybdenum generally oxidizes at about 600° F. (330° C.) to about 800° F. (440° C.). Therefore, at temperatures greater than about 600° F. (330° C.), the molybdenum upper tube portion 34 should be protected against the oxidizing atmosphere of the mounting hole 24. The inconel lower tube portion 36 may extend to any point within the mounting hole 24 at which the temperature is lower than about 1,700° F. (950° C.), as long as it is not exposed to (i.e. contacts) molten or partially molten glass which enters the mounting hole 24. However, if the lower tube portion 36 is protected against the oxidizing atmosphere of the mounting hole 24 it may extend beyond the 1,700° F. (950° C.) temperature limit, as long as it does not contact molten glass. In general, molten glass volatilizes sodium and sulphur, among other things. The volatilized sodium combines with oxygen at high temperatures to form alkali corrosives such as soda (NaO). The volatilized sulphur combines with oxygen at high temperatures to form sulphur corrosives such as sulphates. The terminology "alkali-sulfate corrosives" as used hereinafter is intended to encompass both alkali and sulphur corrosives, although the primary corrosive mechanism is believed to be alkali corrosion and oxidation.

More particularly, some molten glass from the body of molten glass 22 held by the furnace flows into the mounting hole 24 to form an annular glass plug 50. A lower portion 52 of the glass plug 50 devitrifies or solidifies at temperatures below about 2,000° F. (1110° C.). The protective sleeve 42 is preferably inserted into the mounting hole 24 to a point proximate to upper portion 54 of the glass plug 50, but not in contact therewith, because the upper portion 54 is constituted of molten glass, which would damage the inconel sleeve 42 if contacted therewith, for the reasons hereinbefore discussed, i.e. alkali-sulfate corrosion. However, the protective sleeve 42 is inserted into the lower portion 52 of the glass plug 50 because it is constituted of molten glass which devitrifies after insertion of the sleeve 42 thereinto. The devitrified glass within the lower portion 52 of the glass plug 50 which is located between the sleeve 42 and the bubbler tube 32 sealingly connects the bubbler tube 32 to the sleeve 42. The sleeve 42 is connected at its lower end 58 to the bubbler tube 32 by welding, e.g. tungsten inert gas welding, or the like, to render the annular space 69 between the bubbler tube 32 and the protective sleeve 42 substantially airtight. Further, the annular space 62 between the sleeve 42 and the walls of the mounting hole 24 is closed by a refractory material, e.g. an annular cement plug 64, which serves to secure the bubbler assembly 26 within the mounting hole 24. The critical zone 44 is believed to occur between the temperature range of about 1,100° F. (610° C.) to about 2,000° F. (1,110° C.). This is an approximation based upon the belief that inconel is subject to alkali-sulfate corrosion and some oxidation at temperatures above about 1,100° F. (610° C.) and should therefore be protected in this range. However, if the bubbler tube is constructed solely from molybdenum, the lower temperature limit of the critical zone 44 is about 600° F. (330° C.) to about 800° F. (440° C.), since molybdenum oxidizes above these temperatures, and must therefore be protected above these temperatures. The upper temperature limit is estimated at about 2,000° F. (1,110° C.) because above these temperatures the glass plug 50 upper portion 54 is constituted of molten glass which will quickly corrode the inconel sleeve 42, yet protect the molybdenum upper tube portion 34.

Referring now to FIG. 3, there can be seen an aperture 70 provided through the sleeve 42. The aperture 70 is adapted to receive a gas supply pipe 74. The gas supply pipe 74 is preferably connected through a valving arrangement 78 to a suitable gas supply source 80 to introduce a gaseous medium into the annular space 69. The gaseous medium is preferably allowed to fill the annular space 69. The gaseous medium is preferably a reducing gas, e.g. a nitrogen and hydrogen mixture (i.e. forming gas), if the gaseous medium is statically held by the annular space 69. The hydrogen acts as a getter in that it scavenges or gets oxygen by combining therewith to form water which reacts with the forming gas and molybdenum to form the dark, dense, protective refractory coating molybdenum dioxide. However, if the hydrogen becomes saturated by the oxygen, then the volatile molybdic oxide is formed, which causes corrosion of the molybdenum. The volume of the annular space 69, the amount of oxygen infiltrating the annular space 69, and the amount of hydrogen in the forming gas, among other things, such as presence of alkali-sulfate corrosives, are all parameters which affect the useful life of the forming gas in the annular space 69. In any event, when the forming gas in the annular space 69 is exhausted, it must be replaced to prevent corrosion of the bubbler tube 32.

Referring still to FIG. 4, there can be seen an aperture 72 provided through the sleeve 42, preferably opposite the aperture 70. The aperture 72 is preferably connected to an exhaust pipe 76. In the preferred embodiment of the present invention, the gaseous medium may be a reducing gas such as a forming gas or may suitably be an inert gas, such as nitrogen. The gas, preferably nitrogen, is delivered from the gas supply pipe 74 under positive pressure at a flow rate of, for example, between about ½ cubic ft. to about 2 cubic ft. per hour, through the aperture 70, through the annular space 69 and thence through the aperture 72 and exhaust pipe 76 for transport to a recovery system (not shown), or the like. The continuously moving nitrogen serves as a purge gas to carry away oxygen and alkali-sulfate corrosives to prevent corrosion of the bubbler tube 32.

The entire bubbler assembly 26 is conveniently supported within the mounting hole 24 in any convenient manner, e.g. by a mounting bracket 84 suitably attached to I-beams 86, 88 which form part of a superstructure (not shown) which supports the furnace.

DETAILED DESCRIPTION OF A SPECIFIC EMBODIMENT

Referring to FIG. 3, a specific embodiment of the present invention, the bubbler tube 32 upper tube portion 34 is constructed of molybdenum and has a 0.75 inch (1.9 cm.) outside diameter, a length of about 41 inches (104 cm.), and a bubbler gas passageway 92 having a lower, main portion 94 of about 9/32 inches (0.71 cm.) in diameter tapering down to an upper, narrower feeder portion 96 of about 0.060 inches (0.15 cm.) in diameter. The lower tube portion 36 is constructed of inconel and has an outside diameter of about ¾ inches (1.9 cm.), a length of about 24 inches (61 cm.), and a bubbler gas passageway 98 of about 0.64 inches (1.68 cm.) in diameter disposed in fluid communication with the upper tube portion 34 bubbler gas passageway 92 at one end and in fluid communication with the bubbler gas supply source 28 at its other end. The sleeve 42 is made of inconel and has an outside diameter of about 1 inch (2.54 cm.) and a wall thickness of about 0.083 inches (0.21 cm.), thereby providing a tolerance of about 0.084 inches (0.21 cm.) between the outside surface of the bubbler tube 32 and the inside surface of the sleeve 42. Otherwise stated, the annular space 69 has a width of about 0.042 inches (0.107 cm.). The sleeve 42 extends from about 8 inches (20.3 cm.) above the bottom end 100 of the upper tube portion 34 to about 8 inches (20.3 cm.) above the bottom end 102 of the lower tube portion 36, and is welded about its periphery at its lower end to the bubbler tube 32. Some of the molten glass 22 enters the mounting hole 24 to form the glass plug 50 which renders the annular space 69 airtight. The aperture 70 and the gas supply pipe 74 and the aperture 72 and the exhaust pipe 76 are located about ½ inch (1.27 cm.) above the bottom end 104 of the sleeve 42. The devitrified lower portion 52 of the glass plug 50 protects the adjacent portion of the sleeve 42 from oxidation and alkali-sulfate corrosion. The bubbling gas and purge gas employed are both nitrogen although this is not limiting to the invention. For example, the bubbling gas and the purge gas may each comprise either a suitable inert or reducing gas, e.g. a hydrogen-nitrogen gaseous mixture (i.e. a forming gas). The bubbler and purge gas pressures and flow rates will vary depending on furnace operating conditions. The bubbling gas pressure must, however, always be maintained in excess of the counterpressure exerted by the head of molten glass 22. The purge gas should be circulated through the annular purge space 69 at a rate sufficient to preclude excessive oxidation and alkali-sulfate deterioration of the bubbler tube 32, and preferably, at a rate which suppresses virtually all encroachment or infiltration of tramp oxygen and alkali-sulfate corrosives into the annular purge space 69. It has been found that a purge gas flow rate of about 1 cu. ft./hr. is effective.

ALTERNATIVE EMBODIMENT OF THE INVENTION

Alternatively, the present invention comprises a bubbler assembly 101 without the sleeve 42. Instead, referring now to FIG. 4, the bubbler assembly 101 has a fluid coolant jacket 110 installed within the mounting hole 24 in surrounding relationship to the bubbler tube 32 such as to extend from the lower portion 52 of the glass plug 50 to a point substantially below the refractory bottom 20. The jacket 110 is suitably supported in any convenient manner, such as by a refractory, e.g. cement, annular plug 111 at the bottom and at the top by the glass plug 50.

Referring additionally to FIG. 5, the fluid coolant jacket 110 preferably comprises three concentrically configured tubes 112, 114, and 116 of progressively greater length and narrower diameter from the outermost tube 112 to the innermost tube 116. The intermediate tube 114 terminates a short distance below the upper end 118 of the outermost tube 112 and is open-ended at its upper end 120. Annular, watertight end caps 103 are provided between the upper ends of the outermost and innermost tubes 112, 116; between the lower end of the outermost tube 112 and the outer surface of the intermediate tube 114; and between the lower end of the intermediate tube 114 and the outer surface of the innermost tube 116. The outermost tube 112 is conveniently attached to the innermost tube 116 and the intermediate tube 114 by welding or the like, e.g. at weld points 122, 124, respectively. The intermediate tube 114 is conveniently attached to the innermost tube 116 by weld 126. Stabilizer fins 128 are provided near the upper end 120 of the intermediate tube 114 between the intermediate tube 114 and the outermost tube 112 and between the intermediate tube 114 and the innermost tube 116, to improve the structural integrity of the fluid coolant jacket 110 and to maintain the proper spacing between the tubes 112, 114, and 116.

The intermediate tube 114 has an inlet orifice 130 near its lower end 132 fluidly connected via feeder pipe 134 to a source 150 of fluid coolant, suitably water, although this is not limiting to the invention. For example, air or any other suitable fluid coolant may alternatively be used. The outermost tube 112 has an outlet orifice 136 near its lower end 138 fluidly connected via an outlet pipe 140 to any suitable destination, such as a fluid coolant return duct (not shown) or a drainage facility (not shown). Water is delivered at a flow rate dependent upon furnace operating parameters, especially temperature, through the feeder pipe 134 into watertight annular space 152 and thence into watertight annular space 154 formed by the outer surface of the intermediate tube 114 and the inner surface of the outermost tube 112. The water then exits through outlet pipe 140 to be recirculated or discharged to a drainage or collection system (not shown).

The bubbler tube 32 is inserted through the innermost tube 116 to extend the full length thereof and into the body of molten glass 22 at a selected distance D from the upper surface 161 of the body of molten glass 22. The bubbler tube 32 outside diameter is preferably just slightly less than the inside diameter of the innermost tube 116 to provide a snug fit to maximize the cooling effect provided by the fluid coolant jacket 110 and to minimize exposure of the bubbler tube 32 to the hostile atmosphere of the mounting hole 24. The bubbler tube 32 is preferably supported by mounting facility 160 which is attached to the furnace superstructure (not shown). The bubbler tube 32 is preferably vertically adjustable by means of the mounting facility 160 to vary the distance D between the top of the bubbler tube 32 and the upper surface 161 of the body of molten glass 22. The water being circulated through the stationarily mounted water jacket 110 serves to lower the temperature within the refractory bottom 20 to minimize corrosive reactions between the oxidizing, alkali-sulfate refractory bottom 20 atmosphere and the bubbler tube 32 outer surface. It is believed that the bubbler tube assembly 101 has primary utility in the refiner portion (not shown) of the glassmaking furnace, especially during product changeovers, e.g. from tinted to clear glass.

Although the present invention has been described in some detail, it should be clearly understood that many variations thereof may become apparent to one skilled in the pertinent art, without departing from the spirit and scope of this invention, which should be interpreted solely on the basis of the appended claims.

What is claimed is:

1. A bubbler assembly mountable within a mounting hole provided through a refractory wall of a glassmaking furnace containing a body of molten glass, comprising:
    a bubbler tube for injecting a gaseous bubbler medium into the body of molten glass;
    a sleeve mounted in surrounding relationship to at least a portion of said bubbler tube to define an annular space between the inner surface of said sleeve and the outer surface of said bubbler tube;
    upper and lower seal means for rendering said annular space substantially airtight; and,
    a corrosion-inhibiting gas contained within said annular space.

2. The bubbler assembly as set forth in claim 1, wherein said corrosion-inhibiting gas is characterized by the property of minimizing oxidization and alkali-sulfate corrosives deterioration of said bubbler tube.

3. The bubbler assembly as set forth in claim 2, wherein said corrosion-inhibiting gas is an inert gas.

4. The bubbler assembly as set forth in claim 2, wherein said corrosion-inhibiting gas is a reducing gas.

5. The bubbler assembly as set forth in claim 4, wherein said reducing gas is forming gas.

6. The bubbler assembly as set forth in claim 2, wherein the refractory wall comprises the refractory bottom of the furnace.

7. The bubbler assembly as set forth in claim 6, wherein said upper seal comprises devitrified glass disposed within said mounting hole.

8. The bubbler assembly as set forth in claim 7, wherein said lower seal comprises a weld.

9. The bubbler assembly as set forth in claim 7, wherein said lower seal comprises an annular plug.

10. A bubbler assembly mountable within a mounting hole provided through a refractory wall of a glassmaking furnace containing a body of molten glass, comprising:
    a bubbler tube for injecting a gaseous bubbler medium into the body of molten glass;
    a sleeve mounted in surrounding relation to at least a portion of said bubbler tube to define an annular space between the inner surface of said sleeve and the outer surface of said bubbler tube, said sleeve having an inlet orifice and an outlet orifice, upper and lower seal means for rendering said annular space substantially airtight; and,
    means for moving a purge gas through said inlet orifice and said annular space, and thence, through said outlet orifice, to thereby purge said annular space of oxygen and alkali-sulfate corrosives.

11. A bubbler assembly mounted within a mounting hole provided through a refractory wall of a glassmaking furnace containing a body of molten glass, comprising:
    a bubbler tube for injecting a gaseous bubbler medium into the body of molten glass;
    a fluid coolant jacket mounted within the mounting hole in surrounding relationship to at least a portion of said bubbler tube, said fluid coolant jacket being configured to provide at least two annular, watertight spaces;
    means fluidly connected to an innermost one of said spaces for circulating a fluid coolant through all of said annular spaces;
    means fluidly connected to an outermost one of said spaces for discharging said circulated fluid coolant from said fluid coolant jacket;
    means for supporting said bubbler tube; and,
    means for facilitating movement of said bubbler tube relative to the refractory wall, independently of said fluid coolant jacket.

* * * * *